United States Patent [19]

Wolfe

[11] Patent Number: 4,775,357
[45] Date of Patent: Oct. 4, 1988

[54] POSITIVE DRIVE BELT

[75] Inventor: John C. Wolfe, Lincoln, Nebr.

[73] Assignee: The Goodyear Tire & Rubber Company, Akron, Ohio

[21] Appl. No.: 23,100

[22] Filed: Mar. 6, 1987

[51] Int. Cl.⁴ ............................................. F16G 1/10
[52] U.S. Cl. ................................... 474/205; 474/263; 474/268
[58] Field of Search ............... 474/205, 263, 264, 268; 156/137–140

[56] References Cited

U.S. PATENT DOCUMENTS

| | | | |
|---|---|---|---|
| 3,078,206 | 2/1963 | Skura | 156/140 |
| 3,404,578 | 10/1968 | Koch et al. | 474/263 |
| 3,535,946 | 10/1970 | Miller | 474/205 |
| 4,235,119 | 11/1980 | Wetzel | 474/205 |
| 4,343,666 | 10/1982 | Wetzel | 474/205 X |
| 4,586,973 | 5/1986 | Marsh et al. | 156/140 |
| 4,626,232 | 12/1986 | Witt | 474/205 |

Primary Examiner—Thuy M. Bui
Attorney, Agent, or Firm—M. R. Dion, Sr.

[57] ABSTRACT

A high capacity, toothed belt having an elastomeric body composed of a single elastomeric compound which includes from 2 to 30 parts of short fiber flock reinforcement. The flock must have a length to diameter (L/D) ratio less than 10:1.

8 Claims, 1 Drawing Sheet

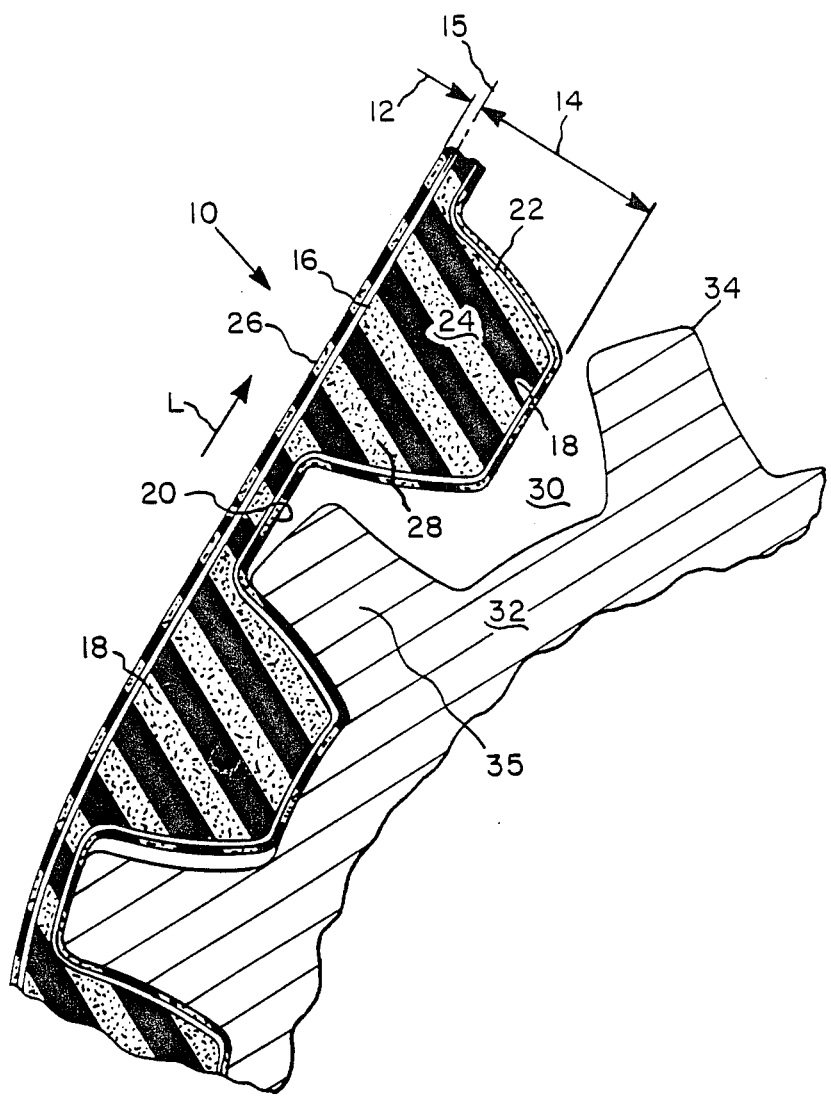

POSITIVE DRIVE BELT

BACKGROUND OF THE INVENTION

This invention relates to a power transmission belt, particularly one having drive teeth for use in positive drive systems.

The use of fiber reinforcement in the tooth portion of a power transmission belt is well known. The long fibers act to mechanically disperse localized stressing in the tooth portion of the belt thus minimizing heat build up and localized shearing stresses. In all known prior belt constructions it was found desirable for there to be a non-fiber reinforced backing layer in the tension section of the belt lying on the opposite side of the inextensible tensile bearing member of the belt.

The ratio of average length to diameter ratio shall be referred to as L/D ratio.

Prior art belt constructions generally utilize fiber having a length sufficient to assume an orientation during mechanical mixing and preparation of the rubber compound. These prior art belts utilize L/D ratios greater than 10 and preferably into the 30 to 40 range. During calendering or extrusion of the fully compounded fiber reinforced rubber compound, the relatively long length fibers tend to orient themselves in the machine direction or perpendicular to the calender rolls or extruder die opening. This orientation in a direction generally parallel to the tensile bearing member of the belt was generally considered to be advantageous since most shear stressing on the belt was in that direction.

The previously mentioned non-fiber reinforced backing compound used above the tensile bearing member has been found to exhibit a tendency to delaminate during high temperature service at the interface between the non-fiber-loaded backing compound and the fiber loaded tooth stock in the prior art belts. This tendency to delaminate at the interface between dissimilar rubber compounds leads to premature failure of the belt and is generally attributed to problems in knitting or adhesion between the two dissimilar stocks. The knitting difficulties are generally attributed to different rheological flow properties and chemical characteristics at the interface which prevail even through the final preparation and curing steps of the belt manufacturing process.

It has been surprisingly and unexpectedly found that the use of a very finely chopped fibrous material commonly called flock having an L/D ratio less than 10 yields a rubber composition which is useable throughout the entirety of the elastomeric body of a positive drive belt. This flock material eliminates the necessity of providing a separate non-fiber reinforced backing layer. The entire elastomeric composition of the belt is a single rubber compound having homogeneously dispersed therein the low L/D flock material. This flock is a carefully selected type of fiber having extremely short lengths and very low ratios of length to diameter. Preferred L/D ratios are below 10/1 and more preferred are flocks below 5/1. The ability to use a single type of fiber throughout the whole elastomeric body of the belt eliminated the many fold problems associated with having dissimilar rubber compounds in the belt. The homogenous composition of this belt eliminated the tendency to delaminate during service along the interface line between the fiber reinforced stocks and the non-fiber reinforced backing compounds of the known prior art belts. This ability to resist delamination yields longer service life. Further, the uniform distribution of flock throughout the tooth portion of the positive drive belt gives substantially improved shear resistance to the tooth compared to non-fiber reinforced tooth stocks. This also yields longer service lives and lower heat build up during service.

BRIEF DESCRIPTION OF THE DRAWINGS

The figure is an enlarged, fractional, longitudinal cross-sectional view of the belt of the invention engaging with a positive drive pulley.

DETAILED DESCRIPTION OF THE INVENTION

The belt 10 of the invention includes a tension section 12 and a compression section 14 divided by the neutral axis 15. Lying approximately on the neutral axis 15 and arranged longitudinally and in the direction of travel of the belt are the tensile bearing members 16 composed of conventionally known substantially inextensible cords or cord fabric. Such tensile members being commonly composed of fiber glass, aromatic polyamides, aliphatic polyamides, polyesters as well as steel and other metallic tensile members. The direction L indicates the longitudinal direction of the belt and tensile bearing members 16 are arranged in the direction L. An evenly spaced series of teeth 18 are arranged on one side of the tensile bearing member 16. Between each adjacent two teeth is a land area 20. The teeth may include an optional jacket fabric 22 on the outer periphery and extending generally through the land area between the teeth on the circumferentially outward directed surface. The tensile bearing member 16 is suspended within the elastomeric body 24 of the belt. This elastomeric body constitutes all elastomeric portions of the belt including the backing section 26 which is positioned on the opposite side of the tensile bearing members 16 from the teeth 18. The unique aspect of the belt 10 of this invention is that the complete elastomeric body 24 is formed from a thermosetting rubber base polymer having incorporated therein short fiber flock 28 which is shown as tiny dots in the elastomeric body 24 of the belt 10.

The short fiber flock as contemplated for use in this invention is to be distinguished from other fibrous reinforcement materials by the limitation that the length to diameter (L/D) ratio must lie between about 10 to about 1. More preferred is the L/D ratio range of 8 to 1.5. The most preferred has been found to be below 5. The selection of short fiber flock 28 in the critical L/D ratio range allows the short fiber flock 28 to be uniformly distributed in the rubber compound of the elastomeric body 24 so that he substantially similar rubber compound is used throughout the belt structure. Unlike the prior art belts, backing section 26 must also include the short fiber flock 28 in order to effectively produce a belt which is of such an integral structure after final curing that delamination is minimized in the critical stress areas of the interface area between the tensile bearing members 16 and the elastomeric portion of the tooth 18. It is in this critical area where most shear failure occurs during severe high torque service in positive drive belt applications. The use of the short fiber flock 28 provides for a continuous rubber phase through the critical interface between the tension section 12 and the compression section 14 of the belt.

The short fiber flock may be incorporated into a thermosetting base rubber compound at varying levels.

Generally short fiber flock 28 should be added at levels below 50 parts per hundred parts of rubber hydrocarbon (hereinafter abbreviated as RHC) of the elastomeric portion 24 of the belt. More preferred is an RHC range between 2 to about 30. Most preferred is between about 8 and about 12. The short fiber flock 28 may be derived from cotton, rayon, nylon, polyester, aromatic polyamide (aramid) or fiber glass. The flock 28 is produced by reducing the length of a mass of already short fibers by cutting or grinding. The ground fibers are then graded by screening to eliminate overly long fibers. Extremely fine short fiber flock with L/D less than 10 is essential for this invention. Accordingly, the material which passes through a 60 to 120 mesh screen is more preferred over materials passing through screens of larger openings. The selection of very short fiber flock having a very low L/D ratio implies the preferred particle is a chopped cylinder which has a length as closely equal to the diameter as possible (L/D=1). The operation of the invention is felt at this time to reside basically in the flock acting as a primary reinforcement material. It is further believed that some degree of orientation of the flock may occur, principally in the machine direction. Placement of the flock loaded rubber stock such that the machine direction is parallel to the tensile member is believed, at this time, to provide optimal shear resistance in the belt. This random orientation of the flock allows for its use in all portions of the belt including the tension section and the compression section composed primarily of the tooth body 18. This is to be contrasted with the prior belt constructions of U.S. Pat. No. 3,535,946 which utilized relatively longer fibers with larger L/D ratios (above 10 to about 60) and which primarily relied on the preferential orientation of the longer fibers to afford a mechanical stress relief in the elastomeric tooth body for proper operation. The use of a uniform elastomeric body 24 throughout the belt 10 avoids any of the inherent difficulties in belt manufacturing of achieving perfect knitting of dissimilar rubber compounds in critical stress areas of the belt structure. The belt 10 is completely uniform throughout its body thus eliminating any interface or shear plane lines produced by the abutment of dissimilar rubber compounds.

The belt 10 of the invention can be produced in any of the conventional methods of positive drive tooth belt manufacturing including the extruded tooth method as generally described by Case in U.S. Pat. No. 2,507,852 or the tooth preform method as generally described by Geist et al in U.S. Pat. No. 3,250,653 or the flow-through method as described by Skura in U.S. Pat. No. 3,078,206. These three U.S. Pat. Nos. 2,507,852; 3,250,653 and 3,078,206 are incorporated herein by reference for the purpose of describing known manufacturing methods for positive drive, toothed power transmission belts.

The most preferred method of manufacturing is the flow-through method in which the rubber compound for the teeth 18 is set on the opposite side of the tensile bearing members 16 and forced by radial pressure through the tensile bearing members 16 to fill the body of the tooth 18. In most high performance belts, the envelope fabric 22 lines the mold prior to the introduction of the rubber compound into the tooth cavity of the mold. The radial pressure forces the fabric 22 into contact with the mold to form the fabric envelope of the belt teeth. Since the invention utilizes a single elastomeric material 24 having short fiber flock uniformly and homogeneously distributed therethrough the process of flowing the elastomeric body 24 through the tensile bearing member 16 is simplified dramatically over prior art methods in which multiple layers of dissimilar elastomeric compounds were placed above the tensile member 16 and forced unevenly through the tensile bearing members 16, thereby forming potentially weak interfaces in the belt body between the dissimilar elastomeric compounds.

COMPARATIVE EXAMPLES

Examples 1–12

Belts according to the invention were manufactured identically with the ony variable being the inclusion of varying levels of short fiber flock in the rubber compound of the belt. A control was run in which a conventional unfilled rubber composition was utilized having no flock reinforcement. Four identical belts were tested identically to get statistically significant average life values. The belts had a width of approximately 19 mm, a length of 928 mm and a tooth pitch of 8 mm. The profile of the individual teeth are shown in the figure with slightly sloped sides. The geometry of the tooth and pulley is generally described in a patent to Gregg et al, U.S. Pat. No. 4,108,011 which is incorporated by reference. The short fiber flock was added at a variable level and the fiber flock was treated prior to incorporation into the rubber with an RFL treatment. The flock used was characterized by the use of standard mesh screen through which the fibers were sifted. In standard screenings, 97% passed through a 60 mesh screen and 80% passed through a 100 mesh screen.

Table I, in Column A, sets out the rubber formulation utilized in the belts of Examples 1–12. The controls, belts 1–4, contained no flock while belts 5–8 and 9–12 contained 2 parts and 12 parts of flock, respectively, per one hundred parts RHC. Table I, Column B, indicates a range of weights of the various ingredients, which are known to be useful for power transmission belts of this type. All values shown in Table I are expressed in units of weight per hundred weight units of rubber hydrocarbon (100RHC). This ties all compounding ingredients directly to the rubber component (polychloroprene) rather than to the total weight of the compound.

TABLE I

| Formulation | A<br>Parts Per<br>100 RHC | B<br>Parts Per<br>100 RHC/Range |
| --- | --- | --- |
| Polychloroprene | 100.00 | 100.00 |
| Mag Oxide | 4.00 | 4.00–8.00 |
| Anti-Oxidant | 7.00 | 4.00–10.00 |
| Process Aids | 14.20 | 5.00–10.00 |
| Carbon Black | 55.00 | 20.00–70.00 |
| Process Oil | 2.50 | 2.50–10.00 |
| Zinc Oxide | 10.00 | 5.00–10.00 |
| Curatives | 0.75 | 0.50–3.00 |
| Flock | variable | 0.50–50.00 |
| Total | | 151.00–256.00 |

The belts were constructed using generally conventional methods. The tensile bearing member 16 was composed of fiber glass cord having a diameter of approximately 1.1 mm. The cord was wrapped approximately 7 cords per centimeter across the face of a building drum having axially positioned grooves in its outer periphery having the configuration of the tooth 18 as shown in the figure.

Once the tensile bearing members 16 were wrapped circumferentially around the building mandrel, a thick layer of elastomeric compound having exactly enough volume to completely fill the elastomeric body 24 of the belt was wrapped on the outer peripheral surface of the circumferentially wrapped tensile bearing members 16. An inflatable bladder was placed around the composite and inflated while the whole assembly was in a 155° C. curing apparatus. The internal pressure of the bladder was gradually increased to about 1.38 MPa thereby forcing the hot elastomeric layer through the tensile bearing members 16 and into the tooth portions of the building mandrel. Once the full pressure was attained in the bladder the uncured formed belt was cured for 30 minutes at 155° C.

After removal from the curing apparatus and cooling, the belts were tested on a 15 horsepower (11.2 kW) testing apparatus using sheaves of 56 mm diameter having grooves 30 which were complimentary in shape to the teeth 18 of the belt. The drive sprocket 32 included teeth 34 between adjacent grooves which generally contacted the land area 20 of the belt during operation. Table II details the life of the belts having varying levels of flock. The control had no flock and is considered to be the state of the art belt at the time of the invention in that the rubber compound had been optimized for long life in automotive applications.

TABLE II

| Belt Example | Flock Loading (per 100 RHC) | Time to Failure* (hours) | Average Life (hours) |
|---|---|---|---|
| 1-4 | 0 | 32, 56, 29, 14 | 33 |
| 5-8 | 2 | 77, 40, 53, 48 | 55 |
| 9-12 | 12 | 63, 137, 69, 77 | 87 |

*Tested at 15 HP (11.2 kW) under a strand tension of 0.68 kN over 56 mm diameter pulleys.

COMPARATIVE EXAMPLES 13 THROUGH 16

In order to assess the advantages of utilizing a homogeneous stock throughout the body of a positive drive belt a series of screening tests were run in which similar and dissimilar compounds were formed into sheets 2.9 mm thick from uncured rubber compounds. Those uncured sheets were pressed together under 3.45 MPa (500 psi) pressure to assure intimate contact. The plied up sheets were then cured at 152° C. for 30 minutes and were subsequently placed in an Instron tester and pulled according to ASTM D413 to determine the peel strength of the bond. The following table sets forth the results of varying levels of short fiber flock when bonded to unfilled similar rubber compositions.

TABLE III

| Example | Rubber Compounds Sheet 1 | Sheet 2 | Peel Strength, MPa (tested by ASTM D413) |
|---|---|---|---|
| 13 | A | B | 3.2 |
| 14 | A | B* | 1.7 |
| 15 | B | B | 4.5 |
| 16 | A | A | 5.2 |

*stock turned 90° from machine direction

The two types of rubber compound used in this comparison were the following: Compound A was the compound shown in Table I with no flock added; Compound B was the same compound with 26 parts of flock added per hundred parts of rubber hydrocarbon (100RHC). Examples 13 and 14 utilized one sheet of Compound A molded to one sheet of Compound B. In Example 14, the Compound B sheet was turned 90° from the direction in which the rubber was taken off the mill on which the compound was mixed. The direction of take off is commonly referred to as the machine direction. Example 15 utilized two sheets of the flock loaded, Compound B. Example 16 utilized two sheets of Compound A, which is the non-flock loaded stock.

The results of Examples 13-16 clearly demonstrate the advantage that this invention provides by allowing the whole belt to be made from a single, high shear compound. Example 15 is a heavily flock loaded compound which shows a high peel strength of the cured interface between similar rubber compounds. This demonstrates good knitting of the two sheets at the interface. The peel strength of the flock loaded Compound B is nearly as good as the non-loaded control stock of Example 16. By contrast, Examples 13 and 14 show low peel strengths, and accordingly poor knitting at the interface between the two dissimilar rubber compounds.

These interfaces of dissimilar rubber compounds are characteristic of prior art belts using relatively long-length fiber reinforcements. These interfaces should show relatively poor knitting similar to the results shown in Examples 13 and 14. This poor knitting would characteristically lead to shear plane failure in the rubber body of the prior art belts at this dissimilar material interface.

However, the belts of this invention do not suffer this disadvantage since the whole of the belt body, including the teeth, is formed from a single flock loaded, high shear strength rubber compound.

While certain representative embodiments and details have been shown for the purpose of illustrating the invention, it will be apparent to those skilled in this art that various changes and modifications may be made therein without departing from the scope of the invention.

What is claimed is:

1. Positive drive belt comprising: an elastomeric body of a single thermosetting rubber having homogeneously incorporated therein a short fiber flock reinforcement having a length to diameter ratio of less than 10:1; a substantially inextensible tensile member extending longitudinally through said body on a neutral axis having a tensile section above said neutral axis and a compression section below said neutral axis; a plurality of teeth formed in said elastomeric body forming said compression section of said belt and regularly spaced longitudinally along the body of said belt.

2. A belt according to claim 1 wherein said short fiber flock is between about 2 to about 30 parts by weight per hundred parts of thermosetting rubber in said elastomeric body.

3. A belt according to claim 1 wherein said short fiber flock is formed of textile filaments selected from the group consisting of aliphatic polyamides, aromatic polyamides, cotton, rayon, nylon, polyester and fiber glass.

4. A belt according to claim 1 wherein the short fiber flock is selected from material which can pass through a 60 to 120 mesh screen.

5. A belt according to claim 1 wherein said length to diameter ratio range is about 8 to about 1.5.

6. A belt according to claim 1 wherein said length to diameter ratio range is about 5 to about 1.

7. A belt according to claim 1 wherein said short fiber flock is oriented throughout said thermosetting rubber and lies generally parallel to said tensile member in said elastomer body.

8. A belt according to claim 1 wherein said flock is incorporated in said elastomeric body at a level of from about 8 to about 12 parts by weight per one hundred parts of said thermosetting rubber.

* * * * *